Aug. 31, 1943.  N. E. WAHLBERG ET AL  2,328,519
TRANSMISSION
Filed Feb. 12, 1941   5 Sheets-Sheet 4
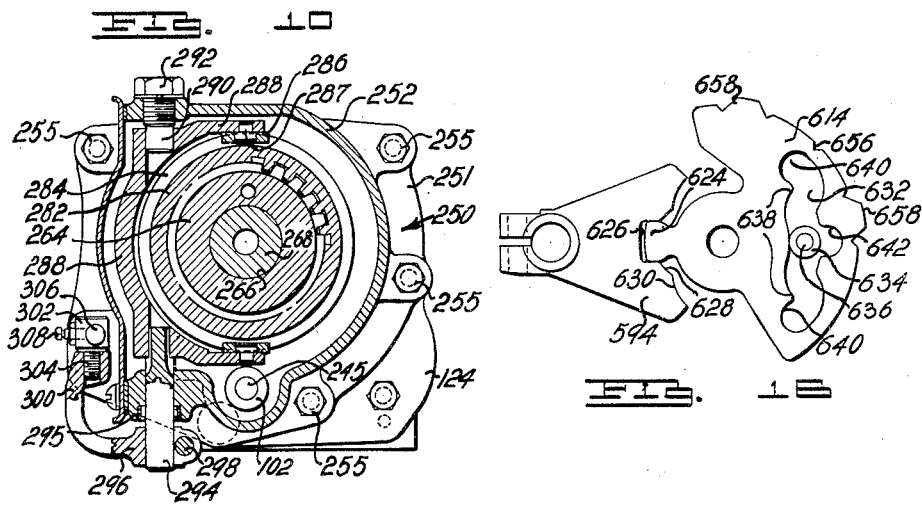
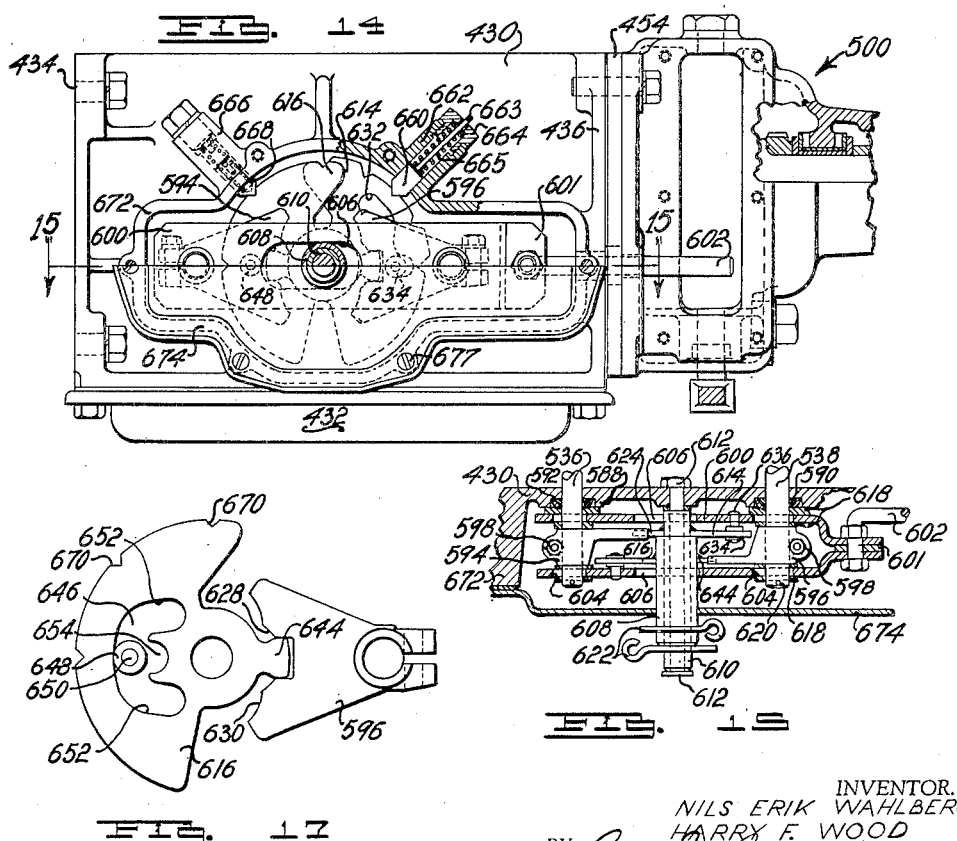
INVENTOR.
NILS ERIK WAHLBERG
HARRY F. WOOD
BY Carl J. Barbee
their ATTORNEY.

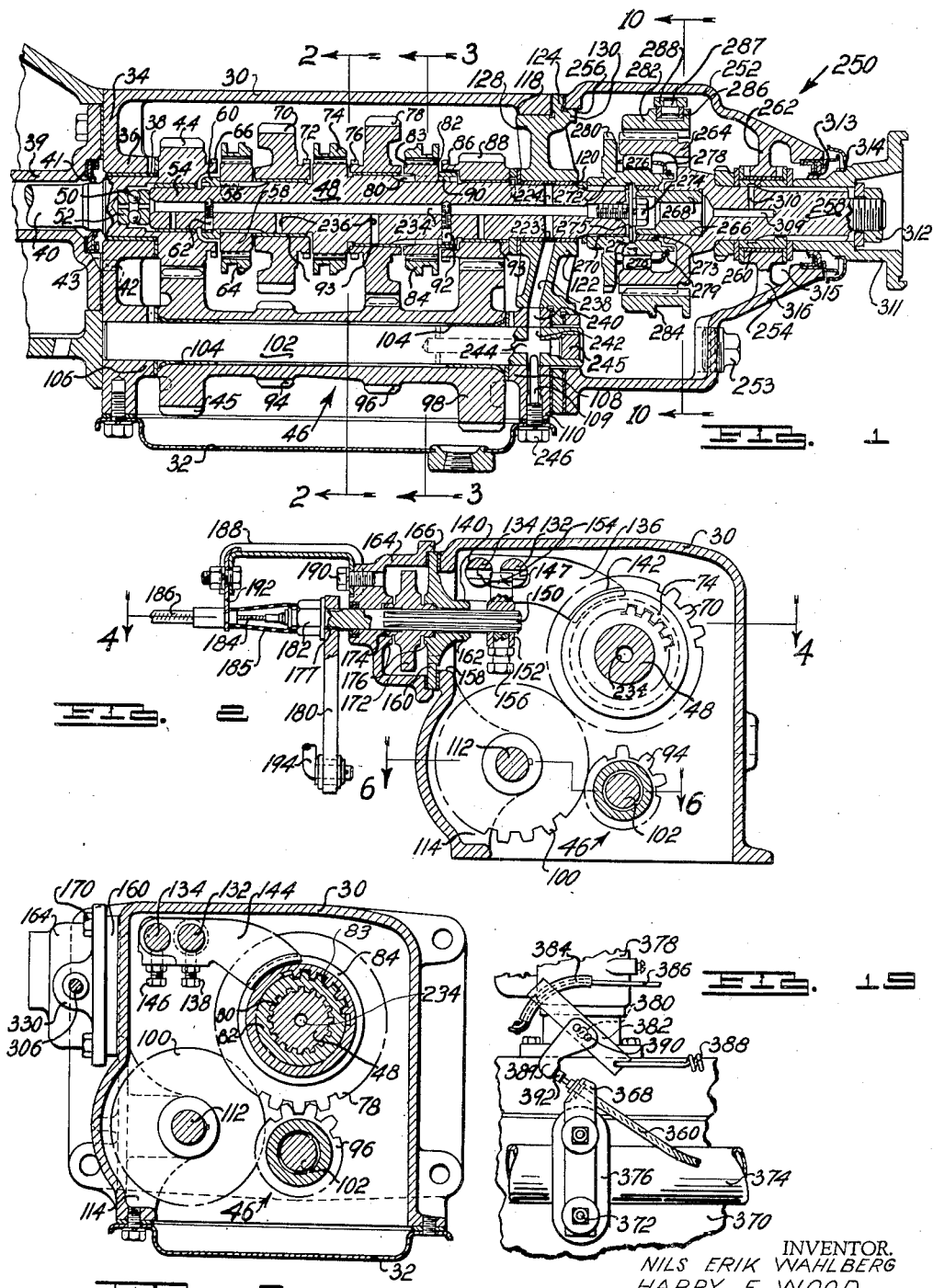

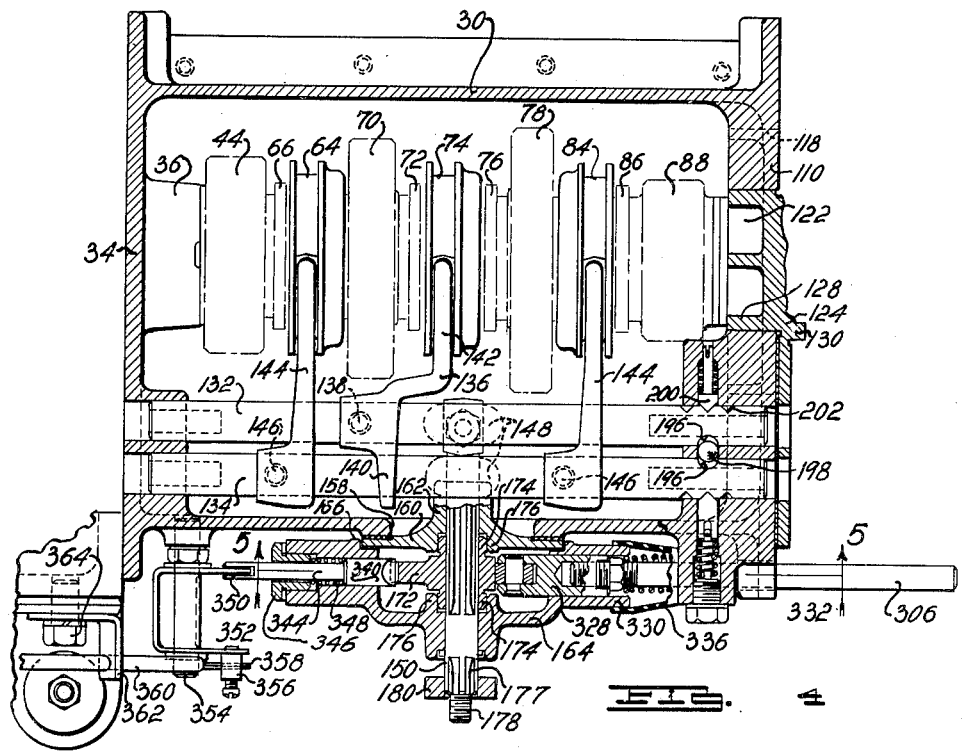
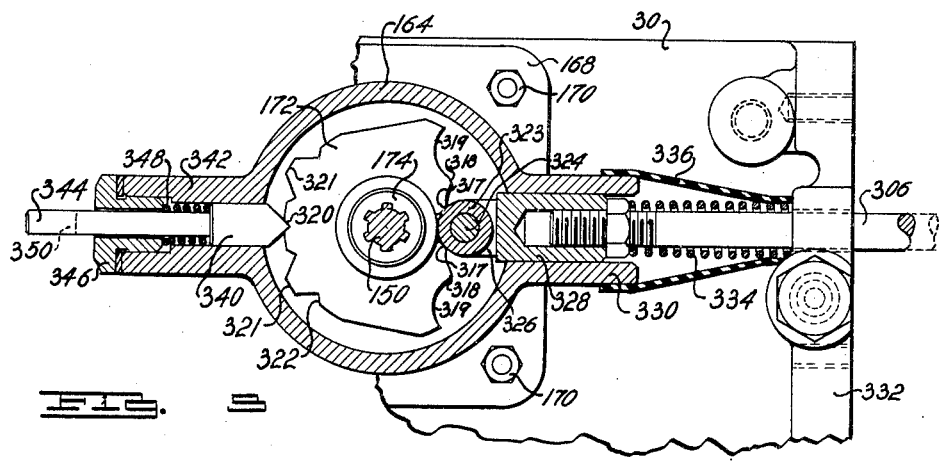

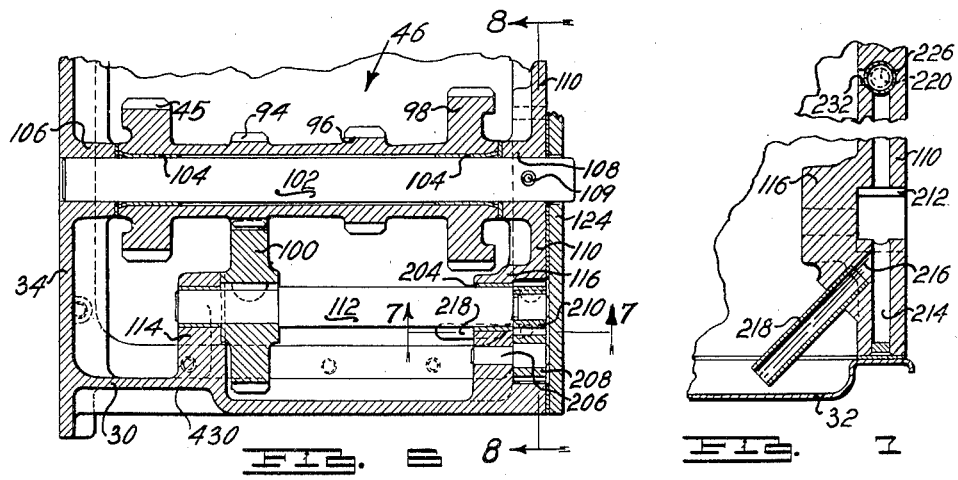
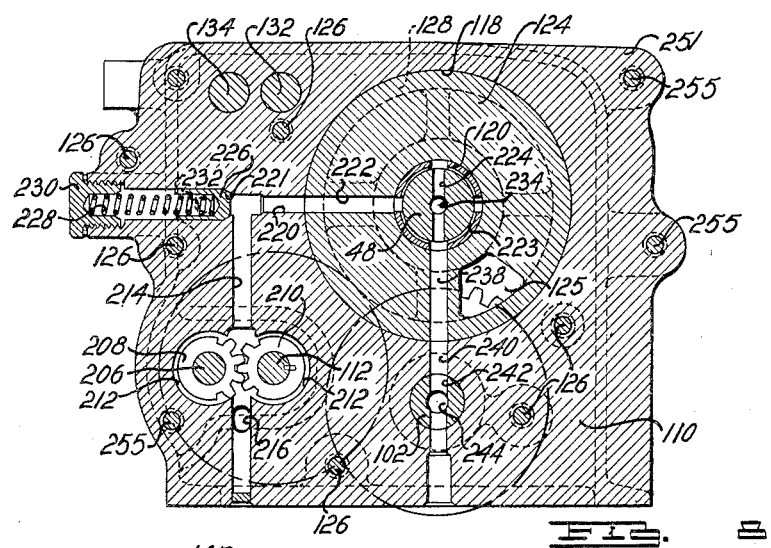
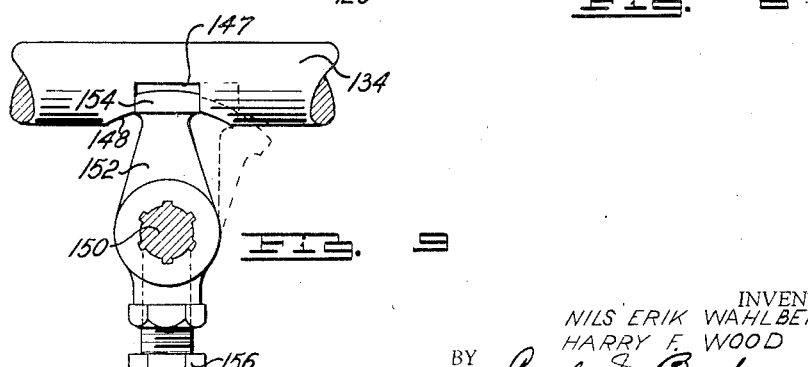

INVENTOR.
NILS ERIK WAHLBERG
HARRY F. WOOD
BY Carl J. Barbee
their ATTORNEY.

Patented Aug. 31, 1943

2,328,519

UNITED STATES PATENT OFFICE 2,328,519

TRANSMISSION

Nils Erik Wahlberg and Harry F. Wood, Kenosha, Wis., assignors to Nash-Kelvinator Corporation, Kenosha, Wis., a corporation of Maryland Application February 12, 1941, Serial No. 378,537

11 Claims. (Cl. 192—.01)

This invention relates to transmissions and has particular reference to a transmission for an automotive vehicle.

It is an object of this invention to provide a transmission in which the process of shifting gears is simplified.

It is another object of this invention to provide a transmission which may be more easily assembled than transmissions known heretofore.

It is another object of this invention to provide a transmission which may be adjusted without completely disassembling the various parts thereof.

It is another object of this invention to provide means for disconnecting the drive shaft of the transmission from the driving wheels of the vehicle while the transmission is being shifted.

It is another object of this invention to provide mechanism for shifting a transmission, which mechanism will also control the speed of the motor to facilitate the shifting of the transmission.

It is another object of this invention to provide novel lockup means for securing the transmission in any one of several driving ratios.

It is another object of this invention to provide a transmission which may be shifted without disconnecting the transmission from the motor.

It is another object of this invention to provide novel means for lubricating a transmission.

It is another object of this invention to provide shifting mechanism for a transmission in which movement of the shift lever through part of its travel serves to disengage the transmission from the driving wheels while movement of the lever through other portions of its travel serves to engage and disengage the gears in the transmission.

It is another object of this invention to provide means for locking and unlocking an overrunning clutch unit while at the same time shifting a transmission.

Other objects and advantages of this invention will be apparent from a consideration of the following description and claims and the attached drawings, of which there are five sheets, and in which—

Figure 1 represents a vertical longitudinal sectional view through a transmission and an overrunning clutch unit;

Figure 2 represents a sectional view taken along a plane indicated by the line 2—2 in Figure 1 and looking in the direction of the arrows;

Figure 3 represents a sectional view taken along a plane indicated by the line 3—3 in Figure 1 and looking in the direction of the arrows;

Figure 4 represents a plan view partially in section taken along a plane indicated by the line 4—4 in Figure 2 and looking in the direction of the arrows;

Figure 5 represents a sectional view taken along a plane indicated by the line 5—5 in Figure 4 and looking in the direction of the arrows;

Figure 6 represents a sectional view taken along a plane indicated by the line 6—6 in Figure 2 and looking in the direction of the arrows;

Figure 7 represents a sectional view taken along a plane indicated by the line 7—7 in Figure 6 and looking in the direction of the arrows;

Figure 8 represents a sectional view taken along a plane indicated by the line 8—8 in Figure 6 and looking in the direction of the arrows;

Figure 9 represents an enlarged detailed view showing the shift finger illustrated in Figure 2;

Figure 10 represents a sectional view taken along a plane indicated by the line 10—10 in Figure 1 and looking in the direction of the arrows;

Figure 14 represents a side elevation partially broken away of the transmission illustrated in Figure 11 and showing a portion of the shifting mechanism;

Figure 15 represents a sectional view taken along a plane indicated by the line 15—15 in Figure 14 and looking in the direction of the arrows;

Figure 16 represents an enlarged detailed view of the direct and overgear shift lever and cam shown in Figure 14;

Figure 17 represents an enlarged detailed view of the low and reverse shift lever and cam illustrated in Figures 14 and 15;

Figure 19 represents a side elevation of a portion of a motor and carburetor arranged to drive the transmission.

Figure 11:
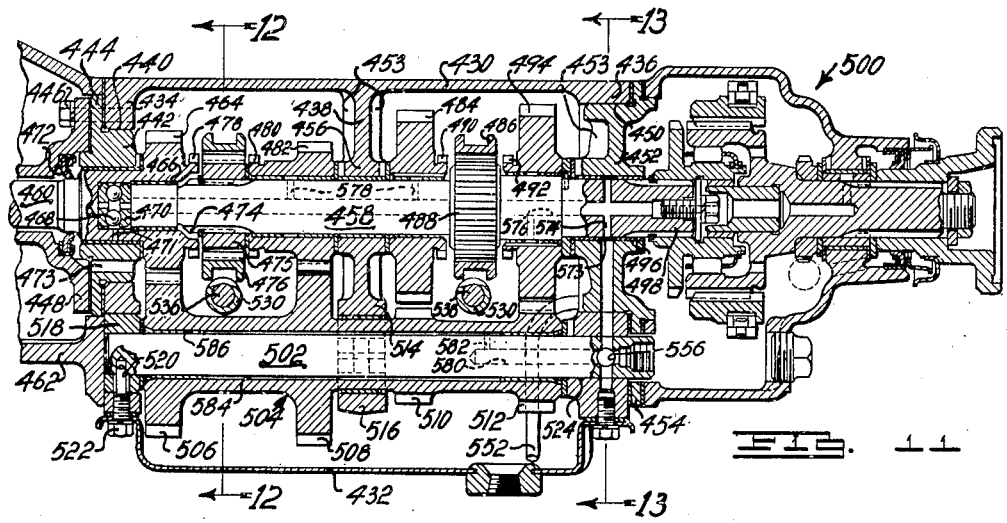
Figure 11 represents a vertical longitudinal sectional view similar to Figure 1 and illustrating a modified type of transmission.
Figures 12, 13:
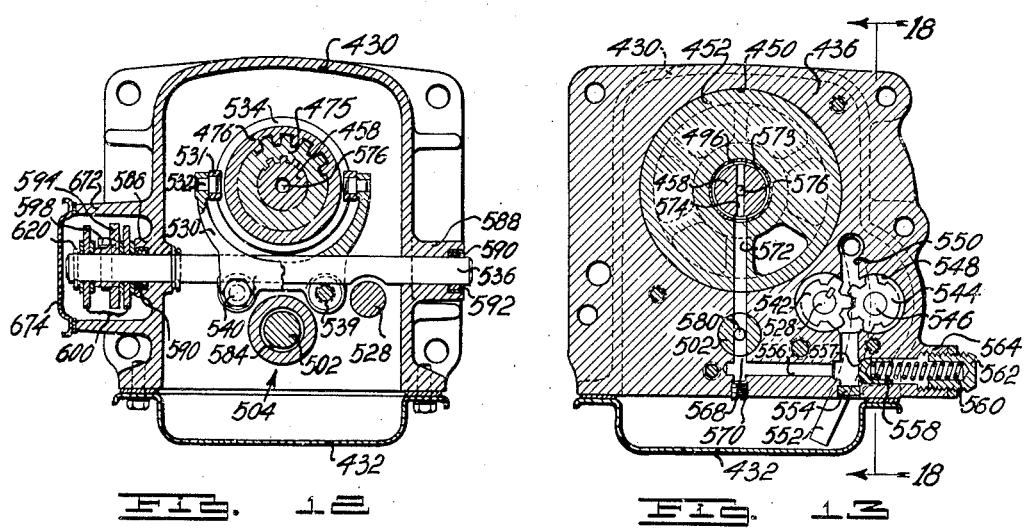
Figure 12 represents a sectional view taken along a plane indicated by the line 12—12 in Figure 11 and looking in the direction of the arrows.
Figure 13 represents a sectional view taken along a plane indicated by the line 13—13 in Figure 11 and looking in the direction of the arrows.

Generally, the invention comprises a transmission in which different gears mounted on the main shaft are constantly engaged with the gears of a countershaft and are arranged to be selectively coupled with the main shaft to provide different driving ratios. The drive shaft of the transmission is connected to the propeller shaft of the automobile through an overrunning clutch unit which is provided with a jaw clutch for locking the two shafts directly together. The mechanism for engaging or disengaging the gear trains is connected with the mechanism for locking and unlocking the overrunning clutch in such a way that the driven shaft of the transmission is always free to be overrun by the propeller shaft, through the overrunning clutch, at the times that the gears are being engaged or disengaged. The shifting mechanism is also provided with a cam operated connection to the carburetor of the automobile so that the motor will be speeded up to insure that the driven shaft will be brought up to the same speed as the propeller shaft in normal shifting ranges and will not be overrun by the propeller shaft at the times when the overrunning clutch is being locked up and to this end the motion given to the carburetor throttle is adequate to cause sufficient motor acceleration to accomplish this purpose in normal shifting ranges.

The transmission is provided with an end bearing for the main shaft which covers the end of the transmission case so that the drive shaft assembly may be inserted into the case as a unit. The transmission is also provided with an oil pump which forces lubricant to the various bearing surfaces so that it is unnecessary to use roller or ball bearings.

Considering first the gear trains and supporting structure of one of the transmissions illustrated, attention is called to Figures 1 through 4 and 6 which illustrate a transmission having a case 30 which is open at the bottom and which may be closed by the pressed metal pan 32. The forward wall 34 of the case 30 is provided with an internal cylindrical boss 36 within which is positioned a bushing of bearing material 38 for supporting the rear end of the clutch shaft 40 which extends forwardly to suitable clutch mechanism (not shown).

A front main bearing cap 39 is positioned around the shaft 40 and is bolted to the front wall 34 of the case. A seal 41 is provided around the shaft 40 to prevent oil discharged from the bushing 38 from escaping forwardly along the shaft. The oil is returned to the inside of the case 30 through a port 42 in the forward wall 34 of the case 30. The bearing cap 39 is notched at 43 to uncover the port 42 (see Figure 1). A gear 44 is cut in the enlarged rear end of the clutch shaft 40, which gear is in constant mesh with a head 45 formed on the countershaft gear cluster generally indicated at 46. The gear 44 and the end of the clutch shaft 40 are recessed to pilot the forward end of the main shaft 48. Thrust bearings 50 are positioned between races 52 located between the end of the main shaft 48 and the end of the recess in the clutch shaft 40.

The main shaft 48 has a forward end portion 54 which is piloted within the recess in the gear 44. Just to the rear of its smooth forward end 54, the main shaft 48 is splined as at 56 to receive a hub 58 which is thus secured against rotation relative to the main shaft 48. The hub 58 is prevented from moving axially with respect to the shaft 48 by means of an internally toothed ring 60 which is fitted in an annular groove formed in the splines 56. The ring 60 is slid over the forward end of the shaft 48, over the splines 56 until it reaches the groove in the splines, after which it is rotated to bring the teeth on the ring into alignment with the splines on the shaft. A spring pressed poppet pin 62 is arranged to snap into the space between the teeth on the ring 60 to prevent its further rotation to bring the teeth into re-alignment with the grooves between the splines on the shaft.

The outer surface of the hub 58 is toothed or splined to receive the internal teeth formed on the direct drive clutch collar 64. The clutch collar 64 is provided with an external, annular groove and is slidable axially of the hub 58 to engage the clutch teeth 66 formed on the rear end of the gear 44 and clutch shaft 40. By engaging the clutch collar 64 with the teeth 66, a driving connection is provided directly from the clutch shaft 40 to the main shaft 48 through the clutch collar 64 and the hub 58.

Just to the rear of the clutch collar 64 and the hub 58 is positioned a reverse gear 70 which is supported for rotation upon the shaft 48. The gear 70 is provided with clutch teeth 72 along the rear face thereof, which teeth are arranged to be engaged by the internal teeth of the low and reverse speed clutch collar 74. The clutch collar 74 is slidably mounted on splines cut in a hub portion of the shaft 48. The clutch collar 74 is also slidable backwardly to engage the clutch teeth 76 cut on the forward face of a low speed gear 78. The low speed gear 78 is also rotatably supported upon the main shaft 48.

To the rear of the low gear 78, the shaft 48 is splined as at 80 to receive a second hub 82 for rotation with the shaft 48. The hub 82 is externally splined as at 83 to receive the internal teeth on an overdrive clutch collar 84. The clutch collar 84 is slidable to the rear to engage the clutch teeth 86 formed on the forward face of an overdrive gear 88. The hub 82 and the gear 88 are separated by a second splined ring 90 and a spring pressed locking pin 92 similar to the ring 60 and pin 62 near the front of the shaft 48. Bushings of bearing material 93 are positioned between the shaft 48 and the gears 70, 78 and 88.

The countershaft gear cluster 46 includes, along with the head gear 45, a reverse gear 94, low gear 96 and overdrive gear 98. The countershaft reverse gear 94 drives through a reverse idler gear 100 (see Figures 2, 3 and 6) to the main shaft reverse gear 70, while the low and overdrive countershaft gears mesh directly and constantly with the low gear 78 and overdrive gear 88 on the main shaft. The countershaft gear cluster 46 is bored axially and is supported on a fixed countershaft 102 by means of bushings 104 of bearing material. The countershaft 102 is supported at its forward end in a boss 106 formed on the forward wall 34 of the transmission case 30 and at its rear end by a second boss 108 formed on the rear wall 110 of the case. Movement of the countershaft 102, both axial and rotative, with respect to the case 30 is prevented by a pin 109 (see Figure 1) formed on one of the bolts which holds the pan 32 to the case.

The reverse idler gear 100 is supported on and keyed to an idler shaft 112 which is journaled at its forward end in an internal boss 114 on a side wall of the case 30 (see Figures 2, 3 and 6) and at its rear end in a thickened portion 116 of the rear wall 110 of the case 30.

The rear wall 110 of the transmission case 30 (see Figure 8) defines a circular opening 118 which is larger in diameter than the largest gear (in this case the low gear 78) on the main shaft 48 so that the main shaft and its gears may be assembled and installed through the rear wall of the case as a unit. The rear end of the main shaft 48 is supported in a bushing 120 mounted in the boss 122 (see Figure 1) formed on the rear bearing plate 124. The rear bearing plate 124 is secured to the back wall 110 of the housing 30 by means of countersunk screws 126 (see Figure 8) while the transmission is being assembled. The rear bearing plate 124 has a forwardly extending flange 128 which fits within the opening 118 in the rear wall of the case 30 and a rearwardly extending annular flange 130, the purpose of which will be more particularly described later.

The mechanism for shifting the transmission is most clearly illustrated in Figures 2, 3, 4 and 5. It consists of an inner shift rail 132 and an outer shift rail 134, each of which is supported in apertures formed in the front and rear walls of the case 30. The inner shift rail 132 carries a single shift fork 136 which is secured to the shift rail by means of the set screw 138 (see Figure 3). It will be noted that the shift fork 136 is provided with an extension 140 which is apertured to pass the outer shift rail 134. In this manner the shift fork is prevented from rotating about the rail 132. The shift fork 136 extends inwardly of the transmission and is provided with a shoe 142 which rides in the annular groove in the low and reverse clutch collar 74. The outer shift rail 134 carries a pair of shift forks 144 which are secured to the rail 134 by means of set screws 146. Each of the shift forks 144 are provided with apertures through which the inner shift rail 132 is slidable. This prevents the forks 144 from rotating with respect to the rail 134. The shift forks 144 are provided with shoes in the same manner as the shift fork 136 and the forward shift fork 144 rides in the annular groove in the forward or direct drive clutch collar 64 while the rear shift fork 144 rides in the groove in the rear or overdrive clutch collar 84. By means of this construction, the forward clutch collar 64 may be moved forwardly to engage the clutch teeth 66 or the rear clutch collar 84 may be moved rearwardly to engage the clutch teeth 86 on the overdrive gear 88 by movement of the outer shift rail 134. Movement of the inner shift rail 132 serves to engage the central clutch collar 74 with either the clutch teeth 72 formed on the reverse gear 70 or the clutch teeth 76 formed on the low gear 78.

As is most clearly illustrated in Figures 2 and 9, the shift rails are each provided with a notch 147 in their lower portion near the middle of the rails. The edges of the notch 147 are cut away as at 148 for a purpose which will be more particularly described later. Positioned underneath the shift rails 132 and 134 and extending at right angles with respect thereto is a rock shaft 150. The shaft 150 is splined to receive an arm 152 provided with a head 154 which is arranged to fit within either of the notches 147. The arm 152 carries a set screw 156 by means of which the arm may be clamped with respect to the shaft 150.

The shaft 150 extends transversely of the case 30 through an aperture 158 formed in the side of the case. A bearing plate 160 (see Figures 2, 4 and 5) is provided with a boss 162 which supports the splined shaft 150 and which is secured to the side of the case 30 by means of a hollow, domed housing 164. The housing 164 is provided with an annular flange 166 which fits around the edge of the bearing plate 160 and is also provided with ears 168 (see Figure 5) through which the cap screws 170 extend to hold the housing 164 and the plate 160 to the outside of the case 30.

Positioned in the housing 164 and splined to the shaft 150 is a cam plate 172, the purpose of which will be more particularly described later. The cam plate 172 is provided with bosses 174 on each side thereof, which bosses are received and journaled in annular flanges 176 formed on the bearing plate 160 and the housing 164; thus the cam plate 172 is arranged to support the shaft 150 and is fixed to rotate with the shaft due to the splined connection between the plate and shaft.

The shaft 150 extends through the side wall of the housing 164 and is provided with an outer splined portion 177 and a threaded end 178. The splined portion 177 supports a shift lever 180 while the threaded portion 178 is arranged to receive a nut 182 which secures the operating wire 184 of a "Bowden" cable 186 to the shaft 150 (see Figure 2). A U-shaped bracket 188 is secured to the housing 164 by the cap screw 190 and carries an anchor 192 for the outer casing of the cable 186. The shift lever 180 has pivotally attached thereto a rod 194. The rod 194 and the "Bowden" cable 186 extend forwardly to a suitable gear shift lever and cross over mechanism (not shown) by means of which the wire 184 may be reciprocated in the casing 186 and the rod 194 may be reciprocated to rock the lever 180. A rubber sleeve or boot 185 prevents dust and moisture from entering the "Bowden" cable.

It should thus be evident that by pushing the wire 184 of the "Bowden" cable 186 towards the transmission or to the right as viewed in Figure 2, the splined shaft 150 will slide axially in the housing 164 and bearing plate 162 to carry the arm 152 and head 154 into engagement with the notch 147 in the inner shift rail 132. A reverse movement of the wire 184 will draw the arm 152 into engagement with the outer shift rail 134. Movement of the rod 194 will rotate the shaft 150 which causes the arm 152 to rotate. The arm 152 will engage the sides of the notches 147, thus moving either one of the shift rails 132 or 134 axially. Movement of the shift rails serves to selectively engage the gear trains by movement of the clutch collars as has been explained above. Attention is called to the fact that the rear ends of the shift rails 132 and 134 are notched as at 196 (see Figure 4) and that a ball 198 engageable with the notches 196 is positioned in an apertured portion of the rear wall of the casing 30 between the shift rails 132 and 134 to function as a lockout device to prevent both of the shift rails from being moved at once. Suitable pins 200 having wedge shaped ends are mounted in the end wall of the casing and are spring pressed into engagement with the speed finder notches 202 cut in the outer edges of the shift rails.

The thickened portion 116 of the end wall 110 of the casing 30 is bored to receive a bushing 204 for rotatively supporting the rear end of the reverse idler shaft 112 (see Figure 6). It is also bored to support a second shaft 206 on which is mounted an oil pump idler gear 208. A driven pump gear 210 is keyed to the end of the reverse idler shaft 112 and is engaged with the idler gear 208. The outer surface of the end wall 110 (see Figure 8) is cut away to form pockets 212 for the gears 208 and 210 and the open face of the pockets 212 is closed by the rear bearing plate 124 of the transmission.

The rear wall 110 of the transmission is provided with a generally vertical passage 214 (see Figure 8) which intersects the pockets 212 along the line of engagement of the gears 208 and 210. The lower portion of the passage 214 is connected by means of a diagonal passage 216 (see Figure 7) to a pipe 218 which extends downwardly into the pan 32 and forms an intake for the oil pump formed by the gears 208 and 210. The upper portion of the passage 214 is connected with a horizontal transverse passage 220 which connects with a radial passage 222 formed in the rear bearing plate 124 of the transmission. The passage 222 extends through the bushing 120 to an annular groove 223 cut in the bushing. The space within the annular groove communicates with a passage 224 formed transversely in the main shaft 48; thus oil will be supplied under pressure to the transverse passage 224 from the pump gears 208, 210.

The outer end of the passage 220 is closed by a valve 226 which is spring pressed into seating engagement with a seat 221 by means of the coil spring 228. The coil spring is backed up by a screw plug 230 threaded into a tapped opening in the outside of the transmission. The plug 226 and spring 228 function as a relief valve to uncover the overflow port 232 through which excess oil is discharged directly into the case 30.

The main shaft 48 is provided with a central axial passage as at 234 so that oil entering the transverse passage 224 will be delivered along the length of the shaft from where it may pass through radial passages 236 to the bushings 93 which journal the gears 70, 76 and 88 on the shaft (see Figure 1). The annular groove 223 also communicates with a vertical manifold 238 drilled in the rear bearing plate 124. The manifold 238 communicates with a vertical manifold 240 formed in the end wall 110 of the case 30. The manifold 240 communicates with a vertically extending hole 242 extending transversely of the countershaft 102. The countershaft 102 is provided with a short axial conduit 244 through which oil from the vertical manifold is delivered to the annular space between the countershaft 102 and the countershaft gear cluster 46. The lower end of the manifold 240 is closed by a cap screw 246 which also secures the pan 32 to the case 30. The pin 109 which prevents the countershaft 102 from moving axially and rotatively within the case 30 is formed as an extension on the cap screw 246. The rear end of the conduit 244 may be closed by a suitable plug 245.

From the above description it should be apparent that the gears 208 and 210 driven by the reverse idler shaft 112 will pump oil through the intake pipe 218 into the vertical passage 214 and the transverse passage 220 from where the oil will pass either to the main shaft and countershaft or through the relief passage 232. Oil passing through the passages in the main shaft and countershaft will, of course, lubricate the bearings as explained above. Since the transmission is provided with forced lubrication, plain bushings may be used which are cheaper than roller or ball bearings normally used in transmissions of this kind.

The overrunning clutch unit generally indicated at 250 in Figures 1 and 10 consists of a housing having a generally cylindrical forward portion 252 and a generally conical rear portion 254. The cylindrical portion 252 is provided with a hole closed by the plug 253 through which the countershaft 102 may be removed to service the transmission without removing the overrunning clutch. The forward cylindrical portion is provided with a circular opening 256 which is arranged to fit over the annular flange 130 formed on the rear bearing plate 124 of the transmission. The unit 250 is thus centered with respect to the main shaft 48 of the transmission. The forward end of the housing 252 is provided with a flange 251 which is secured by means of bolts 255 to the transmission housing 30. Positioned within the housing 250 is a tail shaft 258. The shaft 258 is journaled in a bushing 260 supported by a rib 262 in the conical portion 254 of the overrunning clutch housing. The forward end of the shaft 258 is enlarged and has a cylindrical outer portion 264 and is provided with an internal axial bore 266 within which a sleeve 268 is positioned.

The rear end of the main shaft 48 extends through the rear bearing plate 124 in axial alignment with the sleeve 268 and is splined as at 270. An inner cam member 272 (see Figure 1) is provided with an internally splined portion and attached to the splined end of the shaft 48. The inner cam member 272 is shaped with a central aperture which is journaled on a bushing 273 carried by the sleeve 268.

A cap screw 274 is threaded into the tapped rear end of the main shaft 48 and holds a washer 275 in position to engage the rear ends of the splines of the cam member 272 to retain it in place on the main shaft 48. The rear end of the cam member 272 is positioned within and concentric with respect to the cylindrical portion 264 of the tail shaft 258. Rollers 276 are retained between the inner cam member 272 and the cylindrical portion 264 by a retaining ring 278 secured to the cam member by a snap ring 279. Ahead of the cylindrical portion 264 of the tail shaft, the inner cam member 272 is provided with a circular plate portion in the edges of which are cut the clutch teeth 280. The outer surface of the cylindrical portion 264 is toothed to receive an internally toothed clutch ring 282 which is slidable axially of the cylindrical portion 264 to engage the teeth 280 on the plate portion of the inner cam member 272. The clutch ring 282 serves to positively lock the inner cam member 272 and the main shaft 48 to the cylindrical portion of the tail shaft 258.

The inner cam member 272 is provided with wedge faces 277 on which the rollers 276 ride. The wedge faces are so arranged that when the tail shaft 258 is revolving faster than the main shaft 48, the cylindrical portion 264 of the assembly will overrun the rollers 276 and the inner cam member 272; however, when the main shaft 48 comes up to the same speed as the tail shaft 258 and tends to run faster than the tail shaft, the rollers 276 are wedged between the cylindrical portion 264 and the wedge faces 277 on the inner cam member 272 to provide a driving connection between the shafts 48 and 258 in one direction.

The clutch collar 282, carried by the cylindrical portion of the tail shaft 258, is provided with an annular groove 284 within which the shoes 286 ride, the pins 287 carried by a shift fork 288 pivoting the shoes 286.

The shift fork 288 is supported at its upper end upon the cylindrical end 290 of a cap screw 292 threaded through the upper wall of the housing 252 (see Figure 10). The lower end of the shift fork 288 is provided with a splined connection to the upper end of a shaft 294 extending through the lower wall of the housing 252. A seal 295 surrounds the shaft 294 and prevents the escape of lubricant from the casing 252. Secured to the lower or outer end of the shaft 294 is a lever 296, the split end of which is clamped in place by means of the bolt 298 and which is provided with an upwardly bent lever arm 300. A connector 302 is provided with a threaded pin 304 threaded into a tapped opening in the upper end 300 of the lever 296. The connector 302 is thus permitted limited rotative movement with respect to the upper end 300 of the lever 296. The connector 302 is bored to receive the end of an overrunning clutch shift rod 306 which is held in place by means of a set screw and lock nut 308.

The bolt 274 which holds the inner cam member 272 on the main shaft 48 is drilled to allow oil from the conduit 234 in the main shaft to pass backwardly through the sleeve 268 to a manifold 309 in the tail shaft 258. From the manifold 309, oil is delivered through a radial passage 310 to the bearing 260. Oil is returned from the free wheeling unit 250 to the transmission housing 30 through the hole 125 in the rear bearing plate 124 (see Figure 8).

A companion flange member 311 for connecting the shaft 258 to a universal joint (not shown) is secured on the splined rear end of the shaft 258 by a nut and washer 312 on the end of the shaft. The rear end of the tapered portion 254 of the free wheeling unit housing carries an annular seal 313 which rides on the companion flange member 311 to prevent oil from escaping from the housing and to keep dust from entering. A slinger ring 314 carried on the companion flange member 311 also cooperates with an annular flange carried by the seal to prevent dust from entering the free wheeling unit. Overflow oil from the bearing 260 which enters the space 315 to the rear of the rib 262 is returned to the forward portion of the case through the aperture 316 in the rib 262.

Attention is now called to the cam plate 172 which is carried on the splined portion of the shaft 150 in the housing 164 as was explained above. As viewed in Figure 5, the cam plate 172 is provided with a series of cam surfaces along its right hand edge which may be characterized as initial moving surfaces 317, locking surfaces 318 and detent surfaces 319. The initial moving surfaces and the locking surfaces are spaced by dwell surfaces positioned between them. The various surfaces are arranged symmetrically about the horizontal axis of the cam plate 172 when the plate is in a position corresponding to the neutral position of the transmission. On the left side of the cam plate 172 as viewed in Figure 5 is provide a neutral notch 320 on each side of which are formed speedup cams 321 and lockup notches 322. The speedup cams 321 and lockup notches 322 are also symmetrically located about the horizontal axis of the plate 172.

The cam surfaces 317, 318 and 319 are arranged to successively engage a roller 323 carried upon a pin 324. The pin 324 is supported within the bifurcated front end 326 of a cylinder 328 which is slidably mounted in a hollow boss 330 formed on the back side of the dome shaped housing 164. The cylinder 328 has a threaded connection with the forward end of the overrunning clutch shift rod 306 so that as the cam roller 323 is engaged by the cam surfaces 317, 318 and 319, the rod 306 will be moved toward the rear of the transmission. The rod 306 extends through a flange 332 formed on the back side of the transmission and a coil spring 334 is telescopically positioned around the rod between the flange 332 and the cylinder 328 to return the rod to its forward position when the cam 172 is rotated to its neutral position. A rubber boot 336 is positioned around the forward end of the rod 306 to prevent dust, dirt and moisture from entering the hollow boss 330 around the cylinder 328.

The cam surfaces 317, 318 and 319 are so spaced and arranged with respect to the shaft 150 and the arm 152 which moves the shift rails 132 and 134 that during the time in which one of the initial moving surfaces 317 is passing across the roller 323, thus moving the clutch ring 282 toward, but not quite engaging, the clutch teeth 280, the splined shaft 150 which carries the cam 172 will have rotated through an angle sufficient to move the arm 152 and one of the shift rails 132 or 134 to engage the selected gear train in the transmission. At this point, the curved top surface of the head 154 of the arm 152 will just clear the lower edge of the notch 147 in the shift rail and can swing across the cut away portion 148 of the notch. (See the position of the arm shown by the dash lines in Figure 9.) After the selected gears are engaged by the rotation of the shaft 150, the cam plate 172 will bring the locking surface 318 of the cam plate into engagement with the roller 323 which pushes the cylinder 328 and rod 306 further toward the right as viewed in Figure 5 and causes the arm 296 and shaft 294 to rotate the shift fork 288 and clutch ring 282 forwardly to engage the clutch teeth 280 in the overrunning clutch unit to lock the unit. During the movement of the cam plate 172 and the shaft 150, the head 154 of the arm 152 will slide over the cut away portion 148 of the shift rail without imparting further movement to the shift rail.

After passing the locking surface 318, the roller 323 will engage the detent surface 319 which acts as a detent to prevent accidental rotation of the cam plate 172 and the shaft 150 out of gear engaging position. Since the surfaces on the cam plate 172 are symmetrical with respect to the neutral position of the cam plate, the above procedure is duplicated whether the shaft 150 is rotated in one direction or another. The procedure is also duplicated no matter whether the shaft 150 has been moved axially into engagement with the inner shift rail 132 or outwardly into engagement with the outer shift rail 134. It is thus evident that with the transmission in neutral or disengaged position, the overrunning clutch 250 is unlocked and before the unit 250 can be locked up, the transmission must be rendered operative by actuating one of the clutch collars to establish a gear train. On return of the transmission to neutral position for a shift to another driving position, the overrunning clutch unit must first be unlocked before the gear train may be disengaged. When the shaft 150 is rotated to return the cam 172 from its locked position and to return the transmission to its neutral position, the head 154 of the arm 152 must first swing back across the cut away face 148 of the shift rail before the shift rail can be moved to disengage the transmission. During this movement, the locking surface 318 of the cam plate 172 will have passed from beneath the roller 323 so that the spring 334 can return the overrunning clutch shift rod 306 to its forward position to unlock the overrunning clutch unit. Thus, the overrunning clutch unit will be unlocked when actual shifting movement of the transmission clutch is taking place regardless of whether the shift is into or out of operative condition of a gear train.

The cam surfaces on the left or forward side of the cam plate 172 may be characterized as a neutral notch 320, speedup surfaces 321 and detents 322. The neutral notch is located along the horizontal axis of the plate 172 when the plate is in a position corresponding to the neutral position of the shaft 150 and the speedup surfaces 321 and detents 322 are positioned symmetrically on each side of the neutral notch. The speedup surfaces are angularly displaced from the neutral notch by an angle slightly less than the angular displacement of the locking surfaces 318 from the initial moving surfaces 317.

The cam surfaces 320, 321 and 322 on the left side of the plate 172 are engageable with the wedge shaped rear end of a pin 340 which is slidable in a hollow boss 342 formed on the left or forward side of the housing 164. The pin 340 has an integral forward portion 344 of reduced diameter which extends through an aperture formed centrally of a plug 346 which closes the hollow boss 342. A coil spring 348 constantly urges the pin 340 into engagement with the surfaces 320, 321 and 322 of the cam plate 172. The forward portion 344 of the pin 340 has its forward end slotted as at 350 to receive an end of a U-shaped link 352 (see Figure 4). The link 352 is pivotally supported upon a shaft 354 secured to the side of the housing 30. Pivotally attached to the other arm of the U-shaped link 352 is a connector 356 to which is secured the end of a control wire 358 of a "Bowden" cable 360. The "Bowden" cable 360 is anchored to an L-shaped clip 362 secured to the side of the clutch housing by a cap screw 364 and extends forwardly to the carburetor 378 of the automobile (see Figure 19).

The forward end of the "Bowden" cable is secured to an anchor 368 which is secured to the motor block 370 by cap screws 372. The cap screws 372 also secure an exhaust manifold 374 to the block by means of the clamp 376. The carburetor 378 has a throttle operated by the shaft 380. The shaft 380 is rotated by means of the lever 382 which has an arcuate rim 384 secured to the upper end thereof. The rim 384 serves as a guide and terminal for the throttle cable 386 which is operated in the usual manner. A throttle return spring 388 is connected to the lower end of the lever 382 and an arm 389 is secured to the lever by the rivets 390. The outer end of the arm is positioned adjacent to the end of the "Bowden" cable when the throttle is in closed position and the operating wire 358 of the cable carries a bumper 392 which is arranged to engage the end of the arm 384 and open the throttle when the "Bowden" cable is operated as explained before. It will be noted that the arm 384 and bumper 392 do not interfere with the normal operation of the throttle. The speedup surface 321 of the cam 172 is arranged to open the throttle of the engine just after the gears of the transmission have been engaged and just before the locking surface 318 of the cam plate 172 passes over the roller 323 to move the clutch collar 284 into locked position. In this manner the motor will be speeded up causing the main shaft 48 of the transmission and the inner cam member 272 of the overrunning clutch unit 250 to come up to the same speed (in all normal shifting ranges) as the cylindrical outer member 264 and the tail shaft 258. This causes the rollers 276 to lock the outer member and the inner cam member of the overrunning clutch unit together so that there is no differential of speed between the two members and so that the clutch collar 284 may easily be engaged with the teeth 280. The speedup cams 321 will also speed up the motor just before the overrunning clutch unit is unlocked, preparatory to shifting out of operative condition of a gear train.

The operation of the transmission as it is shifted from neutral through the various gear trains is as follows:

With the automobile at rest and the motor running, the transmission will be first disengaged from the motor by the usual clutch mechanism, after which the shifting mechanism will be operated by the driver to move the rock shaft 150 and arm 152 inwardly of the transmission into engagement with the inner shift rail 132. Then the lever 180 will be rotated causing the rock shaft 150 and arm 152 to rotate toward the rear of the transmission; thus moving the inner shift rail 132 and the shift fork 136 to the rear, causing the clutch collar 74 to engage the clutch teeth 76 on the low speed gear 78. During this movement, the overrunning clutch 250 will have been in unlocked position but continued movement of the lever 180 will cause the locking surface 318 of the cam plate 172 to force the roller 323 and shift rod 306 to the rear of the transmission to lock the overrunning clutch as has been explained before. The transmission is then in position to drive through the clutch shaft gear 44 to the countershaft gear cluster and the main shaft low speed gear 78 from where power is delivered through the clutch collar 74 to the main shaft 48. The main clutch may then be engaged to connect the motor to the transmission, causing the automobile to move forwardly.

After the automobile has attained sufficient forward speed, the shifting mechanism may be operated to rotate the lever 180, the arm 152 and rock shaft 150 forwardly. The initial forward rotation of the shaft 150 will cause the cam plate 172 to unlock the overrunning clutch 250 so that thereafter if the throttle in closed, the momentum of the vehicle will cause the propeller shaft to overrun the main shaft 48 of the transmission. Continued rotation of the rock shaft 150 will disengage the clutch collar 74 from the teeth 76 and since there is no load on the transmission other than the friction of the gears due to the fact that the propeller shaft is overrunning the transmission shaft, this shift may be made without disconnecting the motor from the transmission.

With the automobile in forward motion and the transmission in neutral as has just been explained, the shifting mechanism may be operated to cause the control wire 184 to draw the rock shaft 150 and arm 152 outwardly of the transmission and into engagement with the outer shift rail 134, after which the lever 180 may be moved to rotate the rock shaft 150 and arm 152 either forwardly or backwardly to engage the transmission in either direct drive or overdrive. In case the shift rail 134 is moved forwardly, the forward shift fork 144 will cause the clutch ring 64 to engage the clutch teeth 66 on the rear end of the clutch shaft to establish a direct drive connection to the main shaft 48. If the shift rail 134 is moved to the rear, the rear shift fork 144 will cause the clutch collar 84 to engage the teeth 86 formed on the overdrive gear 88 to establish the overdrive connection in the transmission. During either of the above movements of the shift rail 134, the rock shaft 150 will first rotate the cam plate 172, first causing the initial moving surface 317 to move the overrunning clutch mechanism towards locked position and at the same time engaging the selected gear train in the transmission. Continued movement of the rock shaft and cam plate will bring the speed-up surface 321 on the left side of the cam plate into contact with the pin 340 which causes the "Bowden" cable 360 to open the throttle and speed up the motor. Speeding up the motor causes the transmission main shaft 48 to come up to the same speed as the propeller shaft so that there will be no differential of speeds between the parts of the overrunning clutch 250. This synchronization of speeds will always occur in normal shifting range. After the two parts of the overrunning clutch have attained the same speed, the locking surface 318 of the cam plate 172 will have been rotated into contact with the roller 323 to cause the overrunning clutch to be locked for positive two way drive. The last movement of the shift mechanism and the rock shaft 150 will cause the surfaces 319 and 322 to engage the roller 323 and pin 340 respectively to prevent accidental shifting of the transmission and overrunning clutch.

To remove the transmission from either direct or overdrive connection, the shifting mechanism will be operated to return the lever 180 and the rock shaft 150 to their neutral position. The first return movement of the rock shaft and cam plate 172 first moves the detent surfaces 319 and 322 away from the roller 323 and pin 340 respectively and causes the speedup surface 321 to operate the pin 340 to speed up the motor and transmission while the locking surface 318 is causing the overrunning clutch mechanism to be unlocked. After the overrunning clutch is unlocked, the final movement of the rock shaft 150 and the arm 152 functions to move the shift rail 134 to neutral position to disengage either the clutch ring 64 or 84, thus leaving the transmission in neutral position.

When it is desired to engage the transmission for reverse drive, the car must be brought to a halt in the normal fashion and the motor disconnected from the transmission by means of the main clutch, after which the engagement of the transmission in reverse drive follows the same procedure of engaging the transmission in low speed drive explained above except that the rock shaft 150 is rotated forwardly.

From the above description it will be apparent that in shifting the transmission from low to direct or overdrive, the overrunning clutch 250 will at all times be unlocked and free to allow the propeller shaft to overrun the transmission shaft during the time in which the gear trains in the transmission are being engaged or disengaged. Immediately after the gear trains are engaged, the motor will be speeded up automatically, causing the two parts of the overrunning clutch to operate at the same speed so that the clutch may be easily locked; thus the transmission may be shifted without disconnecting the motor from the transmission after the automobile has been initially started. The transmission will at all times drive the automobile through a positive two way drive which enables the driver to make use of the braking properties of the motor in decelerating the automobile.

In the modified form of the invention illustrated in Figures 11 through 17 is shown a transmission having a case 430 which is open at the bottom and which may be closed by the pressed metal pan 432. The case 430 is provided with a front wall 434 and a rear wall 436. A center wall 438 is provided in the case midway between the front and rear walls. The front wall 434 defines an aperture 440 within which is positioned a front bearing plate 442. The front bearing plate is provided with a flange 444 which extends over a portion of the front wall 434 and which is attached to the front wall by means of cap screws 446. The cap screws 446 also retain a front bearing cap member 448 to the transmission housing.

The rear wall 436 defines an aperture 450 within which is positioned a rear bearing plate 452 which is provided with a flange 454 overlying the rear wall of the case. The center wall 438 is provided with a boss 456 which is bored to receive a journal for supporting the midsection of the main shaft 458. The rear bearing plate 452 and the center wall 438 are provided with strengthening ribs 453.

The apertures 440 and 450 are large enough so that the gears carried by the main shaft 458 may be inserted through the end walls of the housing 430. The forward bearing plate 442 is apertured to form a journal for the rear end of a clutch shaft 460 which extends forwardly to clutch mechanism (not shown) positioned in the clutch housing 462. A gear 464 is formed on the rear end of the clutch shaft 460 and the rear end of the shaft is recessed to receive a sleeve 466 of bearing material within which is piloted the forward end of the main shaft 458. Thrust bearings 468 and races 470 are positioned between the end of the main shaft 458 and the bore in the clutch shaft. A radial passage 471 permits oil to pass from the recess in the clutch shaft to the clutch shaft bearing. A seal 472 prevents oil from escaping forwardly from the bearing cap 448 along the clutch shaft 460. Oil collecting against this seal is returned to the case 430 through the hole 473 formed in the front bearing plate 442.

Just to the rear of the forward end of the main shaft 458, the shaft is provided with a splined portion 474 on which an internally splined hub 475 is secured by means of a snap ring. The outer surface of the hub 475 is splined to receive the internal splines of a direct and overdrive speed clutch collar 476. The clutch collar 476 is slidable axially of the hub 475 to engage clutch teeth 478 cut on the rear edge of the gear 464. The shift ring is movable backwardly to engage the clutch teeth 480 formed on the forward end of an overdrive gear 482 which is journaled for rotation upon the main shaft 458.

To the rear of the intermediate wall 438 of the transmission case a reverse gear 484 is journaled for rotation upon the main shaft 458. The reverse gear 484 may be engaged with the main shaft 458 by means of a second clutch collar 486 which is mounted on a splined hub 488 formed on the main shaft 458. The clutch collar 486 is movable forwardly to engage clutch teeth 490 cut on the rear face of the reverse gear 484. The clutch collar 486 is movable backwardly to engage clutch teeth 492 cut on the front face of a low speed gear 494 which is journaled for rotation upon the main shaft 458 just to the rear of the hub portion 488.

The rear end of the main shaft 458 is journaled in a sleeve of bearing material 496 supported in the rear bearing plate 452. The main shaft 458 is provided with a splined rear end 498 which extends to the rear of the rear bearing plate 452 to connect with an overrunning clutch unit generally indicated at 500. The overrunning clutch unit 500 is the same as the overrunning clutch unit 250 shown in Figure 1 and described above.

Positioned underneath the main shaft 458 and supported by a countershaft 502 is a countershaft gear cluster generally indicated at 504 which consists of a head gear 506, an overdrive gear 508, a reverse gear 510 and a low gear 512. The midsection of the countershaft gear cluster 504 is journaled in a bearing 514 formed in the intermediate wall 438 of the case 430. A bearing cap 516 is removably secured to the bearing 514 to complete the journal. Attention is called to the fact that by use of the split bearing 514, 516, the countershaft gear cluster may be dropped downwardly through the open bottom of the case 430 after the countershaft 502 has been removed.

The forward end of the countershaft 502 is supported in a bearing block 518 supported in a suitable aperture in the front wall 434 of the transmission case. The bearing block 518 and the shaft 502 are restrained from rotation and axial movement with respect to the transmission case 430 by an indexing pin 520 formed on the end of a cap screw 522 which also serves to secure the pan 432 to the open side of the transmission case. The bearing block 518 is provided so that an aperture may be formed in the front wall of the transmission case through which a tool may be inserted to machine the intermediate bearing 514, 516. The rear end of the countershaft 502 is supported in an aperture 524 formed in the rear wall 436 of the transmission case.

The gear 464 formed on the rear end of the clutch shaft 460 is in constant mesh with the head gear 506 of the countershaft gear cluster 504 so that the countershaft cluster is constantly driven by the clutch shaft 460. The overdrive gear 508 is constantly in mesh with its corresponding gear 482 carried on the main shaft 458. The reverse gear 510 is constantly in mesh with a suitable reverse idler gear (not shown) which is keyed to the reverse idler shaft 528 (see Figure 13). The low speed gear 512 is constantly in mesh with the corresponding low gear 494 carried on the main shaft 458.

The gear 464 formed on the clutch shaft and the various gears carried on the main shaft 458 are selectively engageable with the main shaft 458 through the clutch collars 476 and 486 as was explained above. The clutch collars are movable by means of shift forks 530, the ends of which are provided with shoes 531 pivoted on the rollers 532 (see Figure 12) and received in annular grooves 534 cut in the outer edges of the clutch collars.

The base portions of the shift forks 530 are provided with transversely extending apertures to receive the rock shafts 536 and 538. Ears 539 are formed on the lower side of the shift forks at each end of the apertures which receive the rock shafts. The ears 539 are split and provided with tapped apertures so that the two parts of the split ears may be drawn together by the cap screws to tightly grip the shafts 536 and 538 (see Figure 12).

The rear end of the reverse idler shaft 528 is journaled in the rear wall 436 of the housing 430 (see Figure 13) and has keyed thereto the driven gear 542 of an oil pump. The driver gear 542 of the oil pump meshes with and drives an idler gear 544 which is supported upon a shaft 546 journaled in the rear wall of the case 430. The rear wall 436 of the case 430 is cut away in a pair of intersecting pockets 548 within which the gears 542 and 546 are positioned. The pockets 548 are closed by the flange 454 of the rear bearing plate 452 to form the body of the gear pump. It will be noted that the pump will be constantly driven through the reverse idler gear 528 and the countershaft gear cluster 504 whenever the transmission is driven by the clutch gear 464.

Figure 18:
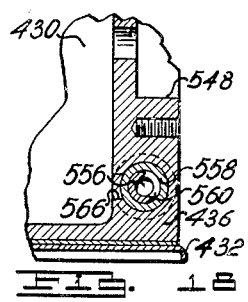
Figure 18 represents a sectional view taken along a plane indicated by the line 18—18 in Figure 13 and looking in the direction of the arrows.

The rear wall 436 of the transmission case 430 is provided with a vertical passage 550 which intersects the pockets 548 along the line of intersection of the pump gears. Oil is drawn by the pump from the pan 432 through an intake pipe 552 which communicates with the upper end of the passage 550. The lower end of the passage 550 is closed by a plug 554 and the rear wall of the transmission case is provided with a horizontal passage 556 which intersects the lower end of the vertical passage 550 below the oil pump. The outer end of the horizontal passage 556 is closed by a valve 558 which is pressed into engagement with a seat 557 formed in the walls of the passage 556 by a coil spring 560. The spring 560 is backed up by a screw plug 562 threaded in a boss 564 formed on the outside edge of the transmission case 430. The slidable valve 558 and the spring 560 function as a relief valve to uncover a bi-pass hole 566 (see Figure 18) cut in the rear wall 436 of the transmission case and communicating with the interior of the transmission.

The horizontal passage 556 extends to the center of the rear wall 436 where it communicates with a vertical manifold 568, the lower end of which is closed by a threaded plug 570. The vertical manifold 568 extends upwardly and communicates with a vertical passage in the end of the countershaft 502. Above the countershaft 502, the vertical manifold 568 communicates with a vertical passage 572 formed in the rear bearing plate 452. The passage 572 extends through the journal 496 which is provided with an annular groove 573. The rear end of the main shaft 458 is provided with a transverse passage 574 which communicates with the groove 573. The main shaft is also provided with an axial conduit 576 from which radial passages 578 extend to each of the journals supporting the gears journaled on the main shaft. The countershaft 502 is also provided with an axial conduit 580 communicating with the vertical manifold 568 and a radial passage 582 (see Figure 11) through which oil may flow to the annular space 584 between the countershaft and the countershaft gear cluster 504 for lubricating the journals 586 which support the gear cluster upon the countershaft.

Lubricant is thus delivered under pressure to all bearing surfaces of the transmission and it is therefore unnecessary to provide roller or other anti-friction bearings in the transmission. When assembled for operation, the transmission case 430 and the overrunning clutch case will be filled with lubricant to a level which will submerge the countershaft gear cluster. Since the transmission will usually be positioned in the automobile with its rear end lower than the front, the lubricant will assume a level which will submerge the lower portion of the overrunning clutch unit 500. The overrunning clutch 500 is also lubricated by oil from the axial conduit 576 in the same manner as is the overrunning clutch 250.

The operation of the rock shafts 536 and 538 in shifting the transmission is most clearly illustrated in Figures 12 and 14 through 17. Each of the shafts is journaled at its ends in bosses 588 formed on each side of the transmission housing and felt seals 590 are secured around the shafts by the metal rings 592 (see Figure 12). The left ends of the shafts 536 and 538 as viewed in the drawings extend beyond the side wall of the casing 430 and have supported thereon the cranks 594 and 596 respectively. The bases of the cranks are provided with split apertures and are clamped tightly to the shafts by means of bolts 598.

Extending between and supported upon the shafts 536 and 538 on each side of the cranks 594 and 596 are the arms 600 of a yoke 601, the rear end of which is bolted to a shift rod 602 connected to the overrunning clutch 500. The arms 600 are slotted as at 604 so that they may move longitudinally of the transmission and transversely with respect to the shafts 536 and 538. The arms 600 are provided with a central slot 606 which is arranged to pass the sleeves 608 and 610 which are telescopically mounted around a supporting bolt 612. The supporting bolt 612 is passed through and supported by the side wall of the transmission case 430 at a point intermediate of the rock shafts 536 and 538.

The sleeve 610, which is positioned within the sleeve 608, has welded thereto a cam plate 614 which is positioned in a plane approximately parallel to the plane of the yoke arms 600. The outer sleeve 608 has welded thereto a second cam plate 616 which is parallel to the cam plate 614. It will be noted that the cranks 594 and 596 secured on the rock shafts 536 and 538 respectively are so positioned as to engage the cam plates 614 and 616 mounted on the sleeves 610 and 608 respectively. Suitable washers 618 positioned around the shafts 536 and 538 maintain the cranks 594 and 596 in the proper position to engage the cam plates 614 and 616. The washers 618 are retained on the rock shafts 536 and 538 by means of cotter pins 620.

The outer ends of the sleeves 608 and 610 each have secured thereto a shift lever 622 which is arranged to be connected by suitable linkage (not shown) to a gear shift lever positioned in the operating compartment of the automobile. It will be noted that the outer sleeve 608 is considerably shorter than the inner sleeve 610 so that the shift levers 622 and the cams 614 and 616 may be attached to the sleeves without interference. The shift mechanism for operating the levers 622 includes suitable cross-over features for selecting the lever which is to be actuated. Any one of several well known types of gear shifting and selecting linkage may be used to actuate the levers 622 and since this linkage does not form a part of this invention, it is not shown.

The cam 614 attached to the inner sleeve 610 is most clearly illustrated in Figure 16 and is shown to have a finger 624 engageable in a notch 626 formed centrally of the crank 594. The crank 594 is cut away adjacent to the notch 626 along arcs as at 628 and in broader arcs 630 on the outside of the arcs 628. Rotation of the sleeve 610 will cause the finger 624 to rotate the crank 594 until the finger moves out of the notch 626 and slides across the arcuate surface 628. In this position the end of the finger 624 will abut against the surface 628 and prevent the return rotation of the crank 594. Since the crank 594 is tightly clamped to the rock shaft 536, it is thus apparent that rotation of the sleeve 610 will cause the rock shaft 536 to move the forward clutch collar 476 into engagement with either the clutch teeth 478 or 480, depending on the direction in which the sleeve 610 is rotated, to engage the transmission in direct or overdrive position as was explained above.

The right side of the cam plate 614 is provided with a slot 632 within which is positioned a roller 634. The roller 634 is journaled on a pin 636 secured to the inner arm 600 of the yoke 601. Since the yoke 601 is attached to the overrunning clutch unit 500 through the rod 602, movement of the yoke by the pin 636 and roller 634 will operate to shift the overrunning clutch unit 500 to either locked or unlocked position as will be described presently.

The slot 632 is provided with cam surfaces which actuate the roller 634 and which may be characterized as locking surfaces 638 and detents 640. The locking surfaces 638 are positioned symmetrically on each side of the horizontal axis of the cam plate 614 when the plate is in its neutral position. The detents 640 are located symmetrically on each side of the neutral axis of the cam plate and outside of the locking surfaces 638.

Rotation of the cam plate 614 will cause the locking surface 638 to be rotated across the roller 634 while the finger 624 of the cam plate 614 is rotating the crank 594 to engage the transmission in either direct drive or overdrive speed ratio depending on the direction of rotation of the cam plate. After the transmission is engaged and the finger 624 has cleared the notch 626, continued rotation of the cam plate will swing the finger 624 across the locking surface 630 of the crank and will complete the rotation of the locking surface 638 of the notch 632 across the roller 634 to lock the overrunning clutch unit and position the detent surface 640 against the roller 634. Attention is called to the fact that the slot 632 is provided with a clearance notch 642 into which the roller 634 may move when the yoke arms 600 are moved by the cam plate 616 carried on the outer sleeve 608 as will be described presently.

The cam plate 616 secured to the outer sleeve 608 is most clearly shown in Figure 17 and is shown to be provided with a finger 644 which is engageable with the crank 596 secured to the rear rock shaft 538. The crank 596 is provided with the same notches as is the crank 594 and functions in the same manner to rotate and lock the rock shaft 538 to engage the transmissin in either low or reverse speeds. On the left side of the cam plate 616 is formed a slot 646 within which is positioned a roller 648 pivoted upon a pin 650 which is secured to the outer arm 600 of the yoke 601. The slot 646 is provided with locking surfaces 652 on each side of its neutral axis which is in a horizontal position when the plate is in neutral position and with a clearance notch 654 into which the roller 648 may move when the yoke 601 is moved by the other cam plate 614. When the cam plate 616 is rotated, the edges of the slot 646 cause the roller 648 to move the yoke arms 600 and the overrunning clutch shift rod 602 toward the rear of the transmission to lock up the overrunning clutch unit 500 after the finger 644 has caused the crank 596 to engage the gears in the transmission in either low or reverse speed ratios.

The outer right hand edge of the cam 614 as viewed in Figure 16 is provided with a neutral notch 656 on each side of which are positioned speedup cams 658. The notch 656 and cams 658 are arranged to engage the wedge shaped end of a pin 660 which is slidably mounted in a boss 662 formed on the side of the transmission housing 430 (see Figure 14). The pin 600 is provided with an integral extension 663 which extends through an aperture in the plug 664. The plug 664 is threaded into the boss 662 and retains a spring 665 against the plug 660 to urge the plug against the outer edge of the cam plate. The extension 663 of the plug 660 is arranged to be connected to the operating wire of a "Bowden" cable (not shown) which extends forwardly to the throttle of the motor in the same fashion as the cable 360 shown in Figure 19. The speedup cams 658 are so positioned with respect to the neutral notch 656 that they will actuate the cable to open the throttle of the motor during the time between the engagement of the gears in the transmission and the locking up operation of the overrunning clutch unit; thus after the gears have been engaged in the transmission, the motor will be speeded up causing the main shaft 458 to engage the overrunning portion of the overrunning clutch unit so that the locking operation may be completed at a time when there is no differential in speeds between the two portions of the clutch. It will be noted that the speedup cams 658 and the throttle connection are provided only on the cam plate 614 which is associated with the direct and overdrive speed gears in the transmission. A second boss 666 is provided on the side of the housing 430 and contains a spring pressed pin 668 which is engageable with notches 670 formed in the outer edge of the cam plate 616; however, these notches and the pin function only as a speed finding arrangement to hold the cam plate 616 against the accidental displacement of it from its proper position.

A rib 672 is formed on the side of the transmission case 430 completely around the cam plates 614 and 616 and the yoke arms 600 and a cover plate 674 is secured to the rib 672 by means of screws 677 to exclude dust and foreign matter from the mechanism.

The operation of the transmission shown in Figures 10 through 17 is very similar to that of the transmission shown in Figures 1 through 10 and is as follows:

With the automobile at rest and with the motor running, the transmission will be disconnected from the motor by the usual clutch mechanism located in the housing 462. To set the automobile in motion, the shifting linkage will be operated to swing the inner shift lever 622 (see Figure 15) to the rear, which will rotate the outer sleeve 608 forwardly, causing the cam plate 616 to rotate the crank 596 toward the rear of the transmission. The crank functions to rotate the rock shaft 538 and shift fork 530 to engage the clutch collar 486 with the teeth 492 on the low speed gear 494. The initial movement of the cam plate 616 will cause the finger 644 to rotate the crank 596 and rock shaft 538 while the roller 648 commences to be moved to the rear by the edge of the slot 646. After the clutch collar 486 has been engaged with the gear 494, continued rotation of the cam plate 616 will swing the finger 644 across the arcuate surface 628 of the arm 596 and into abutting engagement with the detent surfaces 630 of the arm and the roller 648 will be moved to the rear of the transmission by the locking surface 652 of the slot. Movement of the roller 648 moves the yoke 601 and the shaft 602 to the rear to lock the overrunning clutch unit 500 for two way transmission of torque forces. With the transmission thus engaged, the motor may be connected to the transmission by the main clutch to start the automobile moving forwardly in low speed gear ratio.

During the above described movement of the yoke 601, the roller 634 carried by the inner arm 600 of the yoke will have moved into the clearance notch 642 in the cam plate 614, thus locking the cam plate 614 against accidental movement.

To move into direct drive from low speed drive with the automobile in motion, the shifting linkage will first be operated to return the inner lever 622 and the cam plate 616 to their neutral position, which movement functions first to unlock the overrunning clutch 500 and then to disengage the clutch collar 486 from the low speed gear 494. Since the initial returning motion of the cam plate 616 will first unlock the overrunning clutch unit, the propeller shaft will overrun the main shaft 458 if the motor is allowed to slow down and there being no load on the gear 494, the clutch collar 486 may be disengaged from the gear 494 without disconnecting the motor from the transmission by use of the usual clutch mechanism. After the low speed gear has been disengaged from the clutch collar 486, the shifting linkage may be operated to swing the outer lever 622 toward the front of the transmission, which motion will rotate the inner sleeve 610 toward the rear of the transmission and will cause the finger 624 of the cam plate 614 to rotate the crank 594 and rock shaft 536 toward the front of the transmission. The forward rotation of the rock shaft 536 serves to engage the clutch collar 476 with the clutch teeth 478 carried on the gear 464 and thus establish a direct drive from the clutch shaft 460 to the main shaft 458.

The first increment of movement of the sleeve 610 and cam plate 614 serves to cause the finger 624 to rotate the crank 594 to complete the engagement of the clutch collar 476. Continued rotation of the cam plate 614 causes the finger 624 to move across the upper arcuate surface 628 and into engagement with the locking surface 630 of the crank 594 while the upper locking surface 638 of the slot 632 is brought into engagement with the roller 634 to move the roller and yoke 601 toward the rear of the transmission. Just before the peak of the locking surface 638 engages the roller 634, the upper speedup cam 658 on the outer edge of the cam plate 614 will engage the pin 660 to open the throttle of the motor which causes the driving member of the overrunning clutch unit 500 to overtake the driven member so that as the peak of the locking surface 638 causes the overrunning clutch unit to be locked, there will be no differential in speed between the two parts of the overrunning clutch.

With the automobile moving forwardly in direct drive, operation of the shifting mechanism to swing the outer lever 622 toward the rear of the transmission will first function to unlock the overrunning clutch unit, then to disengage the clutch collar 476 from the gear 464, at which time the transmission will be in disengaged position. Further movement of the lever 622 toward the rear of the transmission will first cause the finger 624 of the cam plate 614 to rotate the crank 594 and rock shaft 536 toward the rear of the transmission to engage the clutch collar 476 with the clutch teeth 480 formed on the overdrive speed gear 482 to connect the transmission in an overdrive gear ratio. It will be remembered that during this time the overrunning clutch unit 500 is unlocked so that the propeller shaft will overrun the transmission and there will be no load on the transmission providing the motor is not accelerated. In this manner, the engagement of the clutch collar 476 with the overdrive gear may be accomplished without disconnecting the motor from the transmission. Continued rotation of the cam plate 614 will cause the lower speedup cam 658 to engage the pin 660 which will speed up the motor and cause the driving member of the overrunning clutch to overtake the driven member as has been explained before, after which the lower locking surface 638 of the cam plate 614 will move the roller 634 and yoke 601 toward the rear of the transmission to lock the overrunning clutch unit.

Shifting the transmission into reverse engagement is accomplished by bringing the automobile to a stop and disconnecting the motor from the transmission by use of the main clutch and then rotating the inner lever 622 toward the front of the transmission. This causes the outer sleeve 608 and cam plate 616 to rotate toward the rear so that the finger 644 rotates the crank 596 and rock shaft 538 forwardly to engage the clutch collar 486 with the clutch teeth 490 cut on the low speed gear 484. After the reverse gear is engaged, the lower locking surface 652 of the cam plate 616 will engage the roller 648 to move the yoke 601 toward the rear of the transmission to lock the overrunning clutch unit 500. With all parts of the transmission thus engaged, the main clutch may be engaged to connect the motor to the transmission.

From the above description it should be apparent that after the automobile is put into forward motion, it is unnecessary to disconnect the motor from the transmission by the use of the usual clutch mechanism since any further shift of the transmission into a forward drive ratio will be accomplished while the overrunning clutch unit 500 is disengaged so that the propeller shaft will overrun the transmission and not exert any load on the transmission.

While we have described our invention in some detail, we intend this description to be an example only and not as a limitation of our invention, to which we make the following claims:

1. In combination with an automotive transmission, a motor for driving said transmission, means for accelerating said motor, an overrunning clutch unit arranged to be driven by said transmission, shift means for engaging and disengaging said transmission, cam means operable by said shift means and engageable with said means for accelerating said motor, locking means for locking and unlocking said overrunning clutch unit, and means connecting said locking means and shifting means so that the said locking means operates to lock said overrunning clutch unit after said transmission has been engaged and after said cam means have accelerated said motor and operates to unlock said overrunning clutch unit before said transmission is disengaged.

2. In combination with an automotive transmission having a plurality of selectively engageable gear trains therein, a motor for driving said transmission, means for accelerating said motor, a plurality of shift rails arranged to selectively engage said gear trains, notches formed in said shift rails, a rock shaft having an arm mounted thereon, means for reciprocating said rock shaft to engage said arm in either of said notches, means for oscillating said rock shaft to cause said arm to reciprocate said shift rails, an overrunning clutch unit arranged to be driven by said transmission, means for locking said overrunning clutch unit, a cam having a splined connection with said rock shaft, a push rod connected to said locking means and arranged to be reciprocated by said cam, a first neutral surface formed on said cam arranged to position said push rod to unlock said overrunning clutch unit, said neutral surface being arranged to engage said push rod when said rock shaft and shift rails are in neutral position, lockup surfaces formed on said cam on each side of said neutral surface, said lockup surfaces being angularly displaced from said neutral surface by an angle not less than the angle of rotation of said shaft required to cause said arm on said rock shaft to move said shift rails to gear engaging position, said arm being arranged to clear said notches in said shift rails while said lockup surfaces on said cam are rotating across said push rod, detents formed on said cam on the opposite sides of said lockup surfaces from said neutral surface, a second neutral surface formed on said cam, a follower arranged to engage said second neutral surface when said push rod is engaged by said first neutral surface, means connecting said follower to said means for accelerating said motor, and speedup surfaces formed on said cam on each side of said second neutral surface and angularly displaced therefrom by an angle slightly less than the angular displacement of said lockup surfaces from said first neutral surface.

3. In combination with an automotive transmission having a plurality of selectively engageable gear trains therein, a motor for driving said transmission, means for accelerating said motor, a plurality of shift rails arranged to selectively engage said gear trains, notches formed in said shift rails, a rock shaft having an arm mounted thereon, means for reciprocating said rock shaft to engage said arm in either of said notches, means for oscillating said rock shaft to cause said arm to reciprocate said shift rails, lockout notches formed in said shift rails, a ball engageable with said lockout notches and a fixed portion of said transmission to prevent simultaneous movement of said shift rails, an overrunning clutch unit arranged to be driven by said transmission, means for locking said overrunning clutch unit, a cam having a splined connection with said rock shaft, a push rod connected to said locking means and arranged to be reciprocated by said cam, a neutral surface formed on said cam arranged to position said push rod to unlock said overrunning clutch unit, said neutral surface being arranged to engage said push rod when said rock shaft and shift rails are in neutral position, lockup surfaces formed on said cam on each side of said neutral surface, said lockup surfaces being angularly displaced from said neutral surface by an angle not less than the angle of rotation required to cause said arm on said rock shaft to move said shift rails to gear engaging position, said arm being arranged to clear said notches in said shift rails while said lockup surfaces on said cam are rotating across said push rod, detents formed on said cam on the opposite side of said locking surfaces from said neutral surface, follower means connected to said means for accelerating said motor and engageable with said cam, a second neutral surface on said cam engageable with said follower when said first neutral surface is in contact with said push rod, and speedup surfaces on each side of said second neutral surface and angularly displaced therefrom by an angle slightly less than the angular displacement of said lockup surfaces from said first neutral surface.

4. In combination with a shiftable automotive transmission, a motor for driving said transmission, an overrunning clutch unit arranged to be driven by said transmission, means for locking said overrunning clutch unit, means for accelerating said motor, a cam plate, neutral surfaces formed on said cam plate, lockup surfaces on said cam plate arranged to move said locking means to locked position, and speedup cam surfaces formed on said cam and arranged to actuate said means for accelerating said motor, said speedup cams being angularly displaced from said neutral surface by an angle less than the angular displacement of said lockup surfaces from said neutral surfaces.

5. In an automotive transmission having a plurality of selectively engageable gear trains therein, gear shift means for engaging one of said gear trains, an overrunning clutch unit arranged to be driven by said transmission, lockup means arranged to lock said overrunning clutch unit for two way drive, a motor for driving said transmission, means connecting said gear shift means to said lockup means arranged to move said lockup means to unlocked position when said gear shift means is in neutral position and to move said lockup means to locked position when said gear shift means is in engaged position, and means connecting said gear shift means to said motor and arranged to accelerate said motor after said gear shift means has been moved to engaged position and just before said lockup means has been moved to locked position.

6. In an automotive transmission having a plurality of selectively engageable gear trains therein, gear shift means for engaging any one of said gear trains, an overrunning clutch unit arranged to be driven by said transmission, lockup means arranged to lock said overrunning clutch unit for two way drive, a motor for driving said transmission, cam means connecting said gear shift means to said lockup means and arranged to move said lockup means to unlocked position when said gear shift means is in neutral position and to move said lockup means to locked position when said gear shift means is in engaged position, and cam means connecting said gear shift means to said motor and arranged to accelerate said motor after said gear shift means has been moved to engaged position and just before said lockup means has been moved to locked position.

7. In combination with an automotive transmission having a plurality of selectively engageable gear trains therein, a shift rail arranged to engage and disengage said gear trains, a rock shaft arranged to move said shift rail, a cam plate carried by said rock shaft for rotation therewith, an overrunning clutch unit arranged to be driven by said transmission, a motor for driving said transmission, lockup means for locking said overrunning clutch unit for two way drive, linkage connecting said lockup means to a follower arranged to be moved by said cam, said cam having a neutral surface arranged to hold said lockup means in neutral position while said rock shaft is in neutral position, lockup surfaces formed on said cam on each side of said neutral surface and arranged to move said linkage to locked position after said rock shaft has been rotated to gear engaging position, means connecting said cam to said motor, speedup surfaces formed on said cam and arranged to move said last mentioned connecting means to speed up said motor after said rock shaft has been rotated to engage said gear train and before said cam member has been rotated to cause said lockup surface to lock up said overrunning clutch unit, and detents formed in said cam arranged to restrain said lockup means and said motor speedup means against accidental movement.

8. In combination with an automotive transmission having a plurality of selectively engageable gear trains therein, a shift rail arranged to engage and disengage said gear trains, a rock shaft arranged to move said shift rail, a cam plate carried by said rock shaft for rotation therewith, an overrunning clutch unit arranged to be driven by said transmission, a motor for driving said transmission, lockup means for locking said overrunning clutch unit for two way drive, linkage connecting said lockup means to a follower arranged to be moved by said cam, said cam having a neutral surface arranged to hold said lockup means in neutral position while said rock shaft is in neutral position, lockup surfaces formed on said cam on each side of said neutral surface and arranged to move said linkage to locked position after said rock shaft has been rotated to gear engaging position, means connecting said cam to said motor, and speedup surfaces formed on said cam and arranged to move said last mentioned connecting means to speed up said motor after said rock shaft has been rotated to engage said gear train and before said cam member has been rotated to cause said lockup surface to lock up said overrunning clutch unit.

9. In combination with an automotive transmission having a plurality of selectively engageable gear trains therein, a motor for driving said transmission, an overrunning clutch unit arranged to be driven by said transmission, a pair of rock shafts arranged to selectively engage said gear trains, lockup means for locking said overrunning clutch unit for two way drive, and means for selectively rotating either of said rock shafts, said last mentioned means being connected to said lockup means to lock said overrunning clutch unit after one of said gear trains has been engaged.

10. In combination with an automotive transmission having a plurality of selectively engageable gear trains therein, a motor for driving said transmission, an overrunning clutch unit arranged to be driven by said transmission, a pair of rock shafts arranged to selectively engage said gear trains, lockup means for locking said overrunning clutch unit for two way drive, and cam means for selectively rotating either of said rock shafts, said last mentioned means being connected to said lockup means to lock said overrunning clutch unit after one of said gear trains has been engaged.

11. In combination with an automotive transmission having a plurality of selectively engageable gear trains therein, a motor for driving said transmission, a throttle for controlling the speed of said motor, an overrunning clutch unit arranged to be driven by said transmission, a pair of rock shafts arranged to selectively engage said gear trains, lockup means for locking said overrunning clutch unit for two way drive, notched cranks carried by each of said rock shafts, a pair of telescopically arranged shafts positioned between said rock shafts, cam members carried by each of said telescopically arranged shafts, each of said cam members having a finger engageable with one of said notched cranks, a slidable member having projections carried thereon, cam surfaces formed on said cam members and arranged to engage one of said projections, said cam surfaces having lockup points arranged to move said projections and slidable member to locked position after said rock shafts have been moved to gear engaging position, a speedup cam surface formed on one of said cam members, a follower member engageable with said speedup cam surface, means connecting said follower with said throttle, linkage connecting said slidable member to said lockup means, and means for rotating said telescopically mounted shafts.

NILS ERIK WAHLBERG.
HARRY F. WOOD.